(12) United States Patent
Ueyama

(10) Patent No.: US 7,436,567 B2
(45) Date of Patent: Oct. 14, 2008

(54) OPTICAL SCANNER AND SCANNING TYPE PROJECTOR

(75) Inventor: Masayuki Ueyama, Takarazuka (JP)

(73) Assignee: Konica Minolta Holdings, Inc., Tokyo (JP)

(*) Notice: Subject to any disclaimer, the term of this patent is extended or adjusted under 35 U.S.C. 154(b) by 0 days.

(21) Appl. No.: 11/803,273

(22) Filed: May 14, 2007

(65) Prior Publication Data

US 2007/0268544 A1    Nov. 22, 2007

(30) Foreign Application Priority Data

May 19, 2006   (JP)   ............... 2006-139990

(51) Int. Cl.
*G02B 26/08* (2006.01)
(52) U.S. Cl. ..................................... 359/224
(58) Field of Classification Search .......... 359/223–226
See application file for complete search history.

(56) References Cited

U.S. PATENT DOCUMENTS 6,819,822 B2 * 11/2004 Behin et al. ................. 359/223
6,859,121 B2 * 2/2005 Arima ........................ 359/224
7,220,009 B2 * 5/2007 Shimada et al. ............. 359/224

FOREIGN PATENT DOCUMENTS

JP   2003-207737 A   7/2003
JP   2005-148459 A   6/2005

* cited by examiner

*Primary Examiner*—Euncha P Cherry
(74) *Attorney, Agent, or Firm*—Sidley Austin LLP

(57) ABSTRACT

An optical scanner is provided with a mirror section; a movable frame positioned to surround the mirror section and to support the mirror section with a pair of torsion bars to hold the mirror section therebetween; a stationary frame to surround the movable frame and to support the movable frame with at least a pair of bendable beams, wherein one end of each of the pair of bendable beams is jointed to the stationary frame and the other end is jointed at a pair of joint sections to hold the movable frame therebetween and a first axis connecting the pair of torsion bars is arranged to be perpendicular to a second axis connecting the pair of joint sections; and a pair of actuators provided on the pair of bendable beams and to make the pair of bendable beams to cause a bending oscillation.

14 Claims, 8 Drawing Sheets

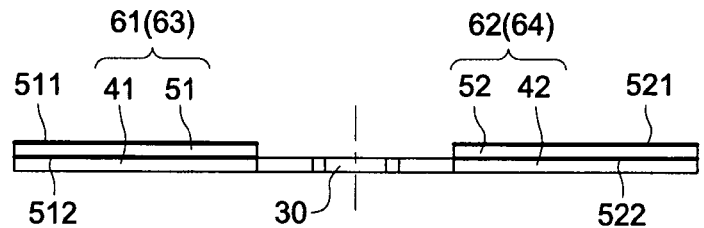
FIG. 2 ( a )
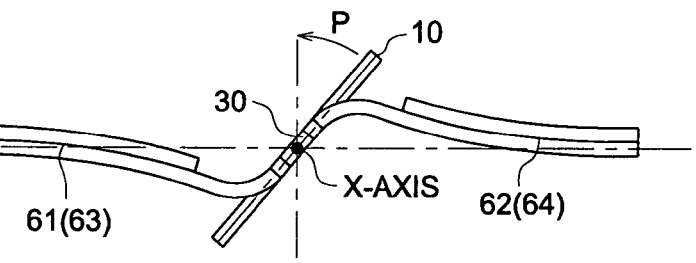
FIG. 2 ( b )
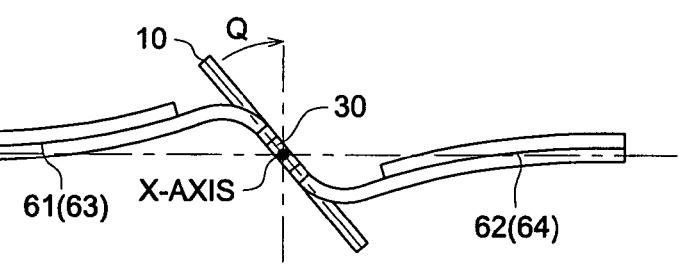
FIG. 2 ( c )
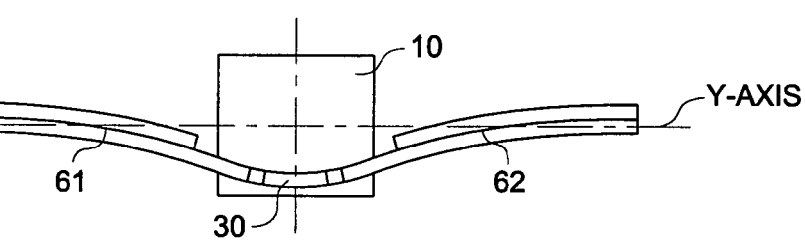
FIG. 2 ( d )
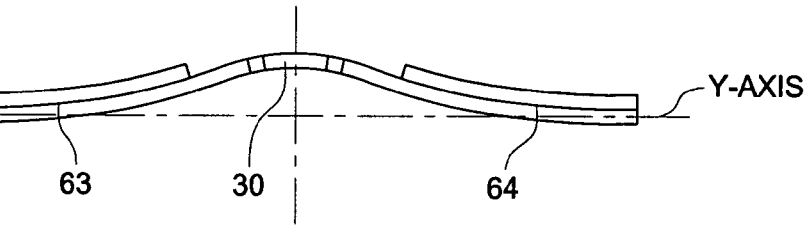
FIG. 2 ( e )

OPTICAL SCANNER AND SCANNING TYPE PROJECTOR

CROSS-REFERENCE TO RELATED APPLICATION

This application is based on Japanese Patent Application No. 2006-139990 filed on May 19, 2006, in Japanese Patent Office, the entire content of which is hereby incorporated by reference.

BACKGROUND OF THE INVENTION

The present invention relates to an optical scanner, and particularly to the optical scanner by which the light is 2-dimensionally scanned.

Presently, the optical scanner by which the ray such as the laser light is deflected and scanned, is used for an optical device such as a bar-code reader, laser printer, display. Conventionally, as the optical scanner such as this, there is a polygonal mirror in which a polygonal column mirror is rotated by a motor, and a galvano-mirror in which a plane mirror is rotation-oscillated by an electromagnetic actuator. However, in a mechanical structure which is driven by the motor or electromagnetic actuator, because the shape of the structural parts is large or cost is high, there is a problem that the downsizing of the device for which the optical scanner is used, is hindered, or results in high cost. Further, when the ray is 2-dimensionally scanned, generally, a device in which the polygonal mirror and the galvano-mirror are combined is used, however, in order to conduct the accurate 2-dimensional scanning, it is necessary that the respective scanning directions are accurately positioned so that the scanning directions by respective mirrors are orthogonal with each other, and there is also a problem that the optical adjustment is very complicated.

Therefore, in order to realize the downsizing, low cost, and the increase of the productivity, by using a micro-machining technology by which silicon or glass for which the semiconductor manufacturing technology is applied, is micro-machined, various micro optical scanners in which the structural parts such as the mirror or an elastic beam are integrally formed on the semiconductor substrate are successively developed.

For example, two frames of an inner frame for supporting the mirror through the first double holding beam, and an outer frame for supporting the inner frame through the second double holding beam are provided, the first and the second double holding beams are orthogonal with each other, and the bending-ness of the second double holding beam and the resonance frequency of the oscillation of the first double holding beam, are made close. Then, the magnetic distortion film is formed on the second double holding beam, and the engineering of the optical scanner (refer to Japanese Patent Unexamined Publication: Tokkai No. 2003-207737) by which, when the distortion and the bending oscillation are generated, the mirror is rotated by using the first and second double holding beams as 2 axes, and 2-dimensionally optical scanning is conducted, further, in almost the same structure] as the optical scanner disclosed in Patent Document 1, 2 frames and 2 double holding beams are provided, and by a plurality of piezoelectric elements arranged in the inner frame and the outer frame, when the rotation torque is respectively independently, acted on the inner frame and the mirror, the engineering of the optical scanner (refer to Tokkai-No. 2005-148459) which rotate the mirror when the first and the second double holding beams are made 2 axes, is disclosed.

However, the optical scanner disclosed in Patent document 1, the distortion and bending oscillation are simultaneously conducted on the second double holding beam by the actuator.

That is, because distortion and bending can not be independently conducted, it is considered to be difficult that the horizontal and vertical deflection are independently controlled. Further, because the resonance frequencies of the distortion oscillation of the first double holding beam and the bending oscillation of the second double holding beam are set so that they are almost same value, when the horizontal and the vertical deflection frequencies are largely different, that is, when the resonance frequencies of the distortion and the bending oscillation are largely different, it is considered to be difficult that the first double holding beam and the second double holding beam are resonated at respectively necessary deflection frequency. Further, the optical scanner disclosed in Patent Document 2, because, as for the horizontal deflection and the vertical deflection, a plurality of piezoelectric element are respectively independently provided, there is a possibility that it results in the complexity of the device, and high cost.

SUMMARY OF THE INVENTION

The present invention has been achieved in view of the above-described problem, and the object of the present invention is to provide an optical scanner in which the complexity or the high cost of the device is not resulted in, and the small size and the deflection of the horizontal and the vertical can be independently controlled.

The above object can be attained by the following structure.

An optical scanner is provided with:
a mirror section having a reflecting mirror to reflect light;
a movable frame positioned to surround the mirror section and to support the mirror section with a pair of torsion bars arranged to hold the mirror section therebetween;
a stationary frame positioned to surround the movable frame and to support the movable frame with at least a pair of bendable beams, wherein one end of each of the pair of bendable beams is jointed to the stationary frame and the other end is jointed at a pair of joint sections arranged to hold the movable frame therebetween and a first axis connecting the pair of torsion bars is arranged to be perpendicular to a second axis connecting the pair of joint sections; and
a pair of actuators provided on the pair of bendable beams and to make the pair of bendable beams to cause a bending oscillation upon receipt of a predetermined driving signal so as to rotate the mirror section around the first axis and the second axis.

BRIEF DESCRIPTION OF THE DRAWINGS

FIGS. 2(a)-(e) are sectional typical views in which the shape at the time of drive of the optical scanner according to the present invention is viewed from the direction of A-A' in FIG. 1.

DETAILED DESCRIPTION OF THE PREFERRED EMBODIMENT

Figure 1:
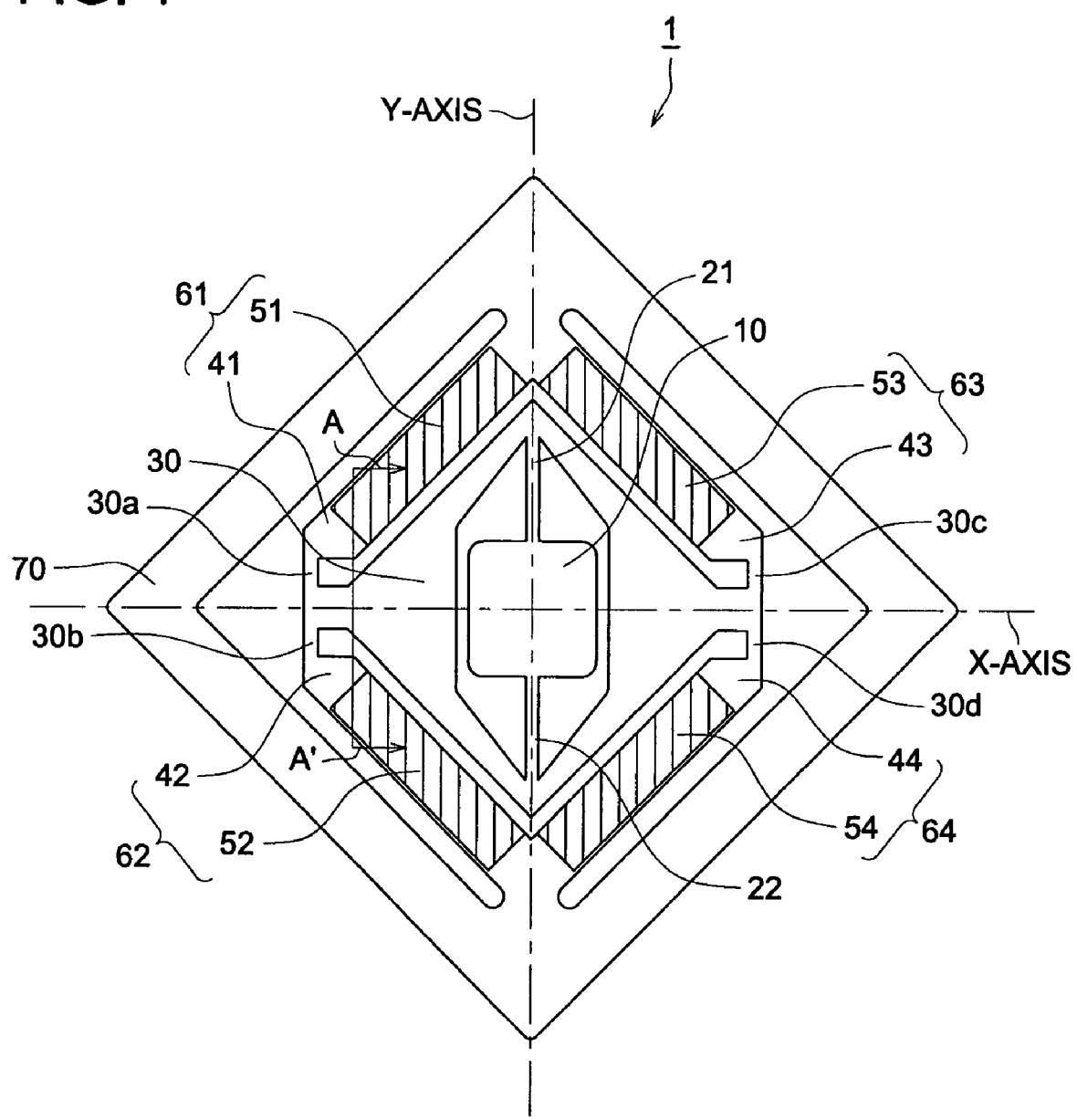
FIG. 1 is a plan view showing the structure by an example of an optical scanner according to the present invention.

Hereinafter, preferable embodiments of the present invention are explained, however, the present invention is not limited to these preferable embodiments.

Firstly, a preferable optical scanner capable of attaining the above objects is explained.

Item 1. In an optical scanner which reflects light emitted from a light source and make the reflected light to scan two dimensionally onto an object, the optical scanner is characterized to be provides with a mirror section to reflect light emitted from the light source; a movable frame to surround the mirror section and to support the mirror section with a pair of torsion bars arranged to face each other on a line passing the center on a surface of the mirror section; a stationary frame to support the movable frame with at least a pair of bendable beams whose one end is jointed with the movable frame in the vicinity of a center axis of the mirror section crossing perpendicularly to the torsion bars; and actuators provided on a surface of each of the pair of bendable beams and to make the bendable beams bending oscillation; and the bendable beams cause a rotational torque to the movable frame by the driving of the actuators and rotate the movable frame around two axis of the torsion bars and the center axis.

Item 2. The optical scanner described in Item 1 is characterized in that the bendable beams are arranged to be symmetry while putting the torsion bars and the center axis or either one of them therebetween and the actuators are driven with respective driving signals having the same phase or phases different by 180 degrees relatively.

Item 3. The optical scanner described in Item 1 or 2 is characterized in that the frequency of the driving signals include a frequency component closer to a resonance frequency of a rotational vibration making the torsion bars of the mirror section as an axis.

Item 4. The optical scanner described in any one Items 1 to 3 is characterized in that the direct current potential of the driving signals is changeable.

Item 5. A scanning type projector is characterized to conduct a correcting action for hand vibration by using the optical scanner described in Item 4.

According to the present invention, a movable frame for supporting the mirror section is supported by a stationary frame through at least a pair of bending beam whose one end is connected to the movable frame in the vicinity of the central axis of the mirror section orthogonal to the torsion bar, further, respective bending frames are provided with actuators which bending oscillate the bending beam. That is, the movable frame is supported to the stationary frame by the bending beam provided with the actuator, so called unimorph section, in the vicinity of the central axis of the mirror section orthogonal with the torsion bar. Accordingly, the respective exclusive bimorph parts for rotating the movable frame around the torsion bar and the central axis are not necessary, and when minimum one pair of actuator is driven by a predetermined drive signal, the bending beam independently acts the rotation torque, around the torsion bar and the central axis on the movable frame, and the movable frame can be rotated around two axes of the torsion bar and the central axis. Hereby, by a simple structure, the mirror section can be two-dimensionally deflected independently horizontally and vertically. Further, because the mirror section is deflected without directly applying the force, the deformation of the mirror section is suppressed, and the deflection or the deviation of the reflected light becomes small. Hereby, the highly fine image can be formed.

Further, because the bendable beams are symmetrically arranged by sandwiching the torsion bar and the central axis or any one of them, the movable frame can be smoothly rotated without single oscillation. Further, because respective actuators provided on the bending beam are driven by the drive signal of the same phase or the phase which is 180° different with each other, the movable frame can be independently rotated without single oscillation by making the torsion bar and the central axis as 2-axes.

Further, because the frequency of the drive signal has the frequency component in the vicinity of resonance frequency of the rotation oscillation whose axis is the torsion bar of the mirror section, even when the rotation angle around the torsion bar is small, when the mirror section is resonated at the resonance frequency, the large deflection angle can be obtained.

Further, because the direct current potential of the drive signal can be adjusted, the scanning area can be shifted. Because the central position of the deflection of the mirror section is determined corresponding to the direct current potential of the drive signal, when the direct current potential of the drive signal is adjusted, the central position of the scanning can be easily shifted. That is, the whole scanning area can be shifted.

Further, when the optical scanner whose direct current level of the drive signal as described above, can be adjusted, is used for the scanning type projector, the hand-vibration correction can be easily realized in the small size and low cost device.

Based on the drawings, an embodiment of an optical scanner according to the present invention will be described below.

Initially, the structure of an optical scanner 1 will be described by using FIG. 1. FIG. 1 is a plan view showing the structure of the optical scanner 1 according to the present invention.

In the optical scanner 1, as shown in FIG. 1, a stationary frame (fixed frame) 70 for fixing the optical scanner to a casing, not shown, a movable frame 30 formed frame-like as the moving part inside the stationary frame 70, and a rectangular mirror section 10 formed further inside the movable frame 30 are formed.

The mirror section 10 is elastically supported to the movable frame 30 from the both sides, by the torsion bars 21, 22, extending to the outside along the Y axis passing the center of the mirror section 10 from the opposite side. Further, the movable frame 30 is elastically supported to the stationary frame 70 from the both sides by the bendable beams 41 to 44 whose respective one end is connected in the vicinity 30a to 30d (joint sections 30a to 30d) of the X axis passing the center of the mirror section 10, which is orthogonal (perpendicular) to the torsion bars 21, 22.

These stationary frame 70, bendable beams 41 to 44, movable frame 30, mirror section 10, and torsion bars 21, 22 are integrally formed by the anisotropic etching of the silicon substrate. Further, on the mirror section 10, the reflection film of the metallic film such as gold or aluminum is formed, the reflection ratio of the incident light is increased.

Further, on the surface of the bendable beams 41 to 44, the piezoelectric elements 51 to 54 which correspond to the actuator in the present invention, and electric-mechanical conversion element are adhered by the adhesion, and 4 unimorphs 61 to 64 are formed. The bendable beams 41 to 44 act by the bending deformation of the piezoelectric elements 51 to 54 on the movable frame 30 the rotation torque around the Y-axis and X-axis independently, and can rotate the movable frame 30 by making the Y-axis and X-axis as 2 axes. Hereupon, the detail of the rotation movement of the movable frame 30 will be detailed later. Further, the bendable beams 41 to 44 are slantingly arranged to Y-axis and X-axis. Hereby, while the optical scanner 1 is arranged compact, because the length of the bendable beams 41 to 44 can be increased, the large displacement amount can be obtained. Further, because the bendable beams 41 to 44 are symmetrically arranged sandwiching the Y-axis and X-axis between them, the movable frame 30 can be smoothly rotated without single oscillation.

Herein, the rotation movement of the movable frame 30 will be described by using FIG. 2. FIG. 2(a) is a sectional typical view in which the shape of the optical scanner 1 is viewed A-A' direction in FIG. 1, FIGS. 2(b) to 2(e) are sectional typical views, in which the shape at the time of the driving of the optical scanner 1, is viewed from the A-A' direction in FIG. 1.

As shown in FIG. 2(a), on the front and rear of the piezoelectric elements 51, 52, the upper part electrodes 511, 521, the lower part electrodes 512, 522 are respectively provided, when between the upper part electrodes 511 (521) and the lower part electrodes 512 (522), in the degree in which the polarization does not occur, AC voltage is applied, the piezoelectric elements 51, 52 are elongated and compressed, and displaces in the thickness direction in the manner of the unimorph.

Initially, the rotation movement around X-axis will be described. When the voltage in the extending direction is applied on the piezoelectric element 51 and the voltage in the compression direction which is reversal phase to the piezoelectric element, is applied on the piezoelectric element 52, because one end of each of unimorph sections 61, 62, is fixed and held to the stationary frame 70, as shown in FIG. 2(b), the unimorph section 61 is bent lower, on the other hand, the unimorph section 62 is bent upper. In the same manner, when the voltage of respective same phase as the piezoelectric elements 51, 52, are applied also on the piezoelectric elements 53, 54, the unimorph section 63 is bent lower, on the other hand, the unimorph section 64 is bent upper. Hereby, on the movable frame 30, the rotation torque around X-axis acts, the movable frame 30 is inclined in the arrowed P direction around X-axis. Further, when the voltage respectively reversal phase to the voltage at the time of description by using FIG. 2(b), are applied on the piezoelectric elements 51 to 54, in the same principle as described above, as shown in FIG. 2(c), the rotation torque around X-axis acts on the movable frame 30, the movable frame 30 is inclined in the arrowed Q direction around X-axis.

Then, when AC voltage holding such a phase relationship is applied on each of piezoelectric elements 51 to 54, the unimorph sections 61 to 64 repeat the oscillation of upper and lower direction following the AC voltage, the seesaw like rotation torque acts on the movable frame 30, and the movable frame 30 rotation oscillates to a predetermined displacement angle around X-axis.

Herein, as shown in FIG. 1, because the parts 30a to 30d in which each of unimorph sections 61 to 64 is connected to the movable frame 30 has the narrow width, the parts are easily bent. Hereby, the X-axis vicinity of the movable frame 30 is largely inclined, as shown in FIG. 2(b), (c), by a slight deflection of unimorph sections 61 to 64, and the mirror 10 can be largely inclined. Hereupon, in the joint sections 30a to 30d, the thickness other than the width may be thinner than the other part.

Next, the rotation movement around Y-axis will be described. When the voltage in the extending direction is applied on also any one of the piezoelectric elements 51, 52, because one end of respective unimorph sections 61, 62, is fixed and held to the stationary frame 70, as shown in FIG. 2(d), both of the unimorph sections 61, 62, are bent lower. On the one hand, when on the piezoelectric elements 53, 54, the voltage in the compressing direction which is reversal phase to the piezoelectric elements 51, 52, is applied, as shown in FIG. 2(a), both of the unimorph sections 63, 64 are bent upper. Hereby, the rotation torque around Y-axis acts on the movable frame 30, and the movable frame 30 is inclined around Y-axis.

Then, when AC voltage holding such a phase relationship is applied respective piezoelectric elements 51 to 54, the unimorph sections 61 to 64 repeat the oscillation of the upper and lower direction following AC voltage, the seesaw like rotation torque acts on the movable frame 30, and the movable frame 30 rotation-oscillates to a predetermined displacement angle around Y-axis.

In this manner, when a predetermined voltage is respectively applied on 4 unimorph sections 61 to 64, an inclination around X-axis and Y-axis Of the mirror section 10 supported by the movable frame 30, can be arbitrarily controlled.

Further, because it is deflected without directly applying the force on the mirror section 10, the deformation of the mirror section 10 is suppressed, the distortion or deviation Of the reflected light becomes small. Hereby, the highly fine image can be formed.

Further, the bendable beams 41 to 44 are symmetrically arranged with X-axis and Y-axis between them, because respective piezoelectric elements 51 to 54 provided on the bendable beams 41 to 44 are driven by the drive signal of the same phase or the reversal phase which is different by 180° to each other, the movable frame 30 can be independently rotated without single oscillation making Y-axis and X-axis as 2-axes.

Figure 3:
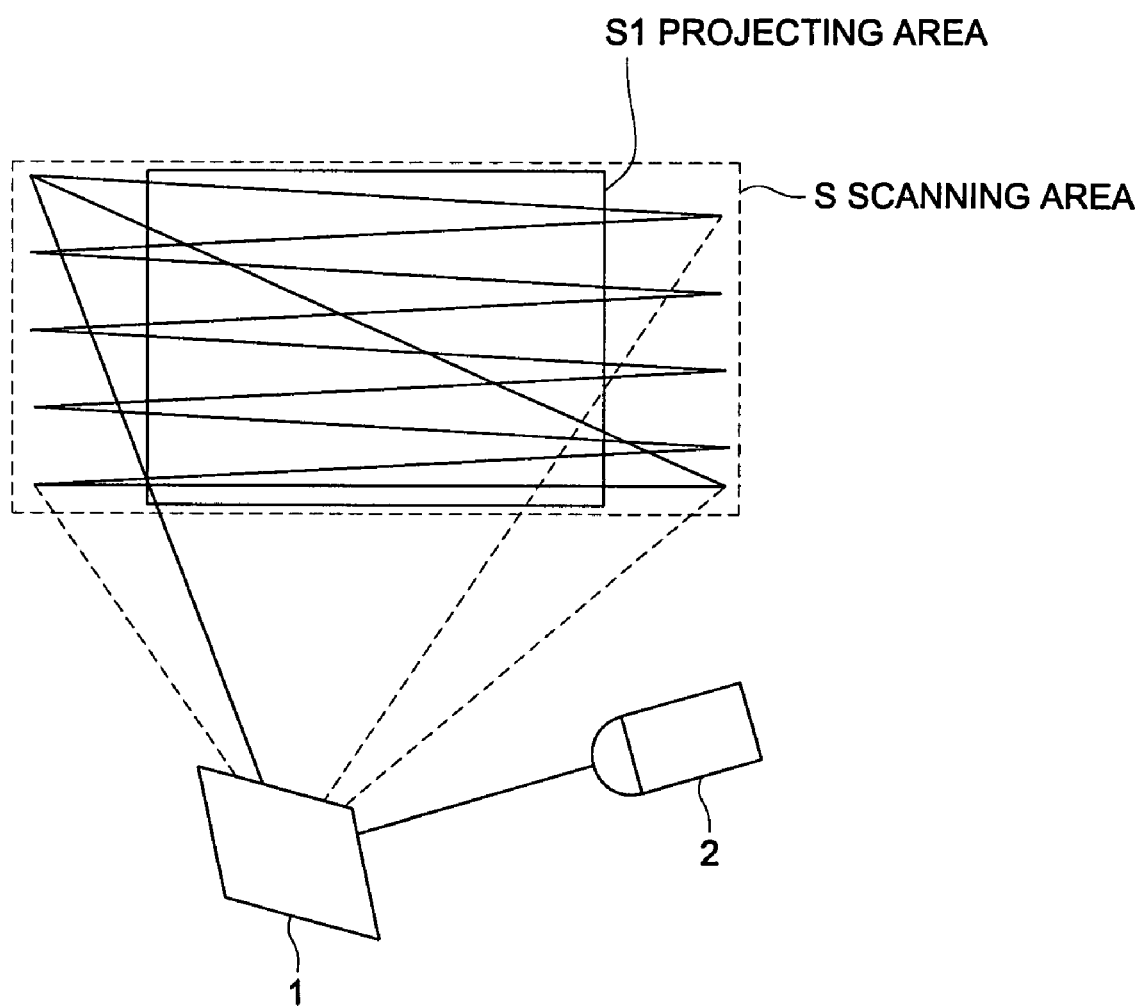
FIG. 3 is a typical view showing the deflection movement of the scanning type projector using the optical scanner according to the present invention.

Next, by using FIG. 3, a method by which the deflection movement of the small sized scanning type projector is conducted by using the optical scanner 1 according to the present invention will be described. FIG. 3 is a typical view showing the deflection movement of the small sized scanning type projector by using the optical scanner 1 according to the present invention.

The scanning type projector luster scans the light projected from the modulated laser diode 2 by the optical scanner 1 and forms the image. Herein, the scanning frequency in the horizontal direction is several 10 KHz, the scanning frequency in the vertical direction is 60 KHz. Further, the deflection angles of the horizontal, vertical direction are respectively about ±10° to ±10°. Further, because the mirror section 10 conducts sinusoidal wave oscillation, and in the peripheral part of the scanning area, the scanning speed is largely lowered, as shown in FIG. 3, the projection area S1 uses the little inside area without using the entire scanning area S.

A method by which the luster scanning conducted by such a structure is realized by the optical scanner 1 according to the present invention, will be described below.

Because in the manner as described above, the unimorph sections 61 to 64 are connected to the movable frame 30 in the vicinity 30a to 30d of X-axis, even by a slight displacement Of the unimorph sections 61 to 64, the movable frame 30 can be largely rotated around X-axis. Accordingly, around X-axis, that is, the vertical scanning can be attained by the above-described drive method. On the one hand, because the connection positions 30a to 30d to the movable frame 300f the unimorph sections 61 to 64 are apart from Y-axis, it is difficult that the movable frame 30 are largely rotated around Y-axis. Therefore, for the rotation around Y-axis, the movable frame 30 is made oscillated by the resonance frequency around Y-axis by the torsion oscillation of torsion bars 21, 22. Hereby, the oscillation is excited on the mirror section 10, and the mirror section 10 can horizontally scan by large oscillation. That is, when the resonance frequency around Y-axis based on the length of the torsion bars 21, 22, width, inertial moment of the mirror section 10 is set to the necessary horizontal scanning frequency, and each of piezoelectric elements 51 to 54 is driven by the drive signal in which the oscillation frequency around X-axis (vertical scanning frequency) and the resonance frequency around Y-axis (horizontal scanning frequency) are superimposed, the luster scanning can be conducted by the necessary frequency and amplitude.

Herein, by using FIG. 4, the detail of the drive signal for conducting the luster scanning, will be described. FIG. 4 (a) is vertical drive signals V1 to V4 in the drive signal of the piezoelectric elements 51 to 54, FIG. 4(b) is horizontal drive signals HH1 to H4 in the drive signal of the piezoelectric elements 51 to 54, FIG. 4(c) is a view showing the drive signal in which the vertical drive signal and horizontal drive signal are synthesized.

Initially, the vertical drive signals V1 to V4 will be described. The vertical drive signals V1 to V4 are the drive signal which rotation oscillates the mirror section 10 around X-axis.

Figure 4A:
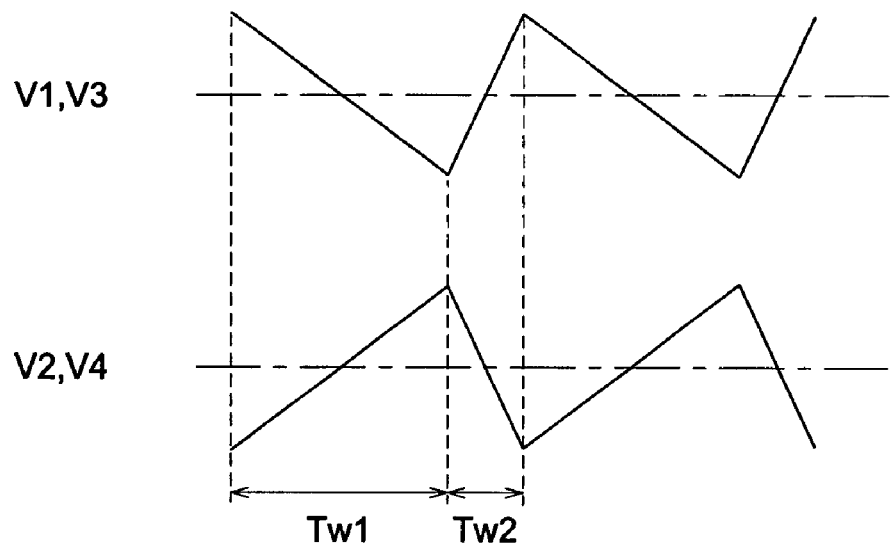
FIGS. 4(a)-(c) views showing the drive signal of the piezoelectric element in the scanning type projector using the optical scanner according to the present invention.
Figure 4B:
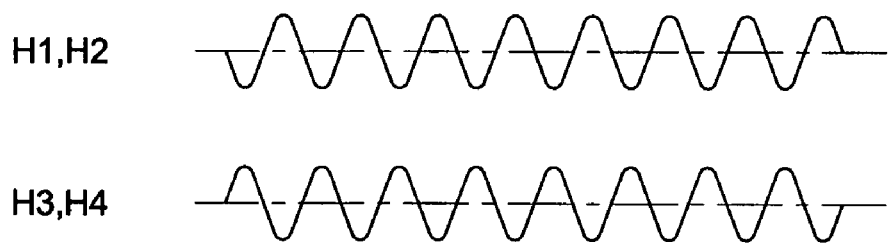
Figure 4C:
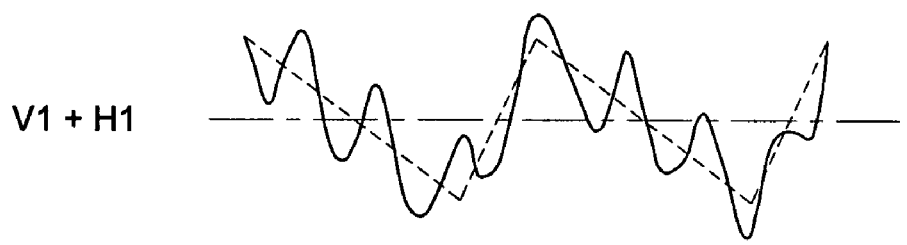

As shown in FIG. 4(a), when the same phase vertical drive signals V1, V3 are applied on the piezoelectric elements 51, 53, further, the vertical drive signals V2, V4 of reversal phase to the vertical drive signals V1, V3 are applied on the piezoelectric elements 52, 54, as described above, the mirror section 10 is rotation oscillated around X-axis, and conducts vertical scanning. Hereupon, the vertical scanning, in FIG. 3, draws while it scans from the upper part of the projection area S1 to the lower part, when drawing is completed, it rapidly returns from the lower part to the upper part. Therefore, the vertical drive signals V1 to V4, as shown in FIG. 4(a), are, to the vertical scanning time tw1, short time saw-toothed wave shape during the retrace line period tw2.

Next, the horizontal drive signals H1 to H4 will be described. The horizontal drive signals H1 to H4 are drive signal which rotation oscillates the mirror section 10 around Y-axis.

As shown in FIG. 4(b), when the horizontal drive signals H1, H2 of the same phase are applied on the piezoelectric elements 51, 52, further, the horizontal drive signals H3, H4 of the reversal phase to the horizontal drive signals H1, H2 are applied on the piezoelectric elements 53, 54, as described above, the mirror section 10 is rotation oscillated around Y-axis, and conducts the horizontal scanning. Hereupon, the frequency of the horizontal drive signals H1 to H4 is the frequency in the vicinity of the resonance frequency of the rotation oscillation around Y-axis of the mirror section 10. Hereby, even when the rotation angle around Y-axis is small, when the mirror section 10 is resonated in the resonance frequency, the large deflection angle is obtained.

Further, the signal for driving the piezoelectric element is described by dividing it 2 drive signals of the vertical drive signal, horizontal drive signal, however, in practice, as shown in FIG. 4(c), it is driven by the signal in which 2 signals are synthesized. FIG. 4(c) is a waveform in which the vertical drive signal V1 and the horizontal drive signal H2 for driving the piezoelectric element 51 are synthesized.

In this manner, the luster scanning conducted by the scanning type projector can be conducted by using the optical scanner 1.

Figure 5:
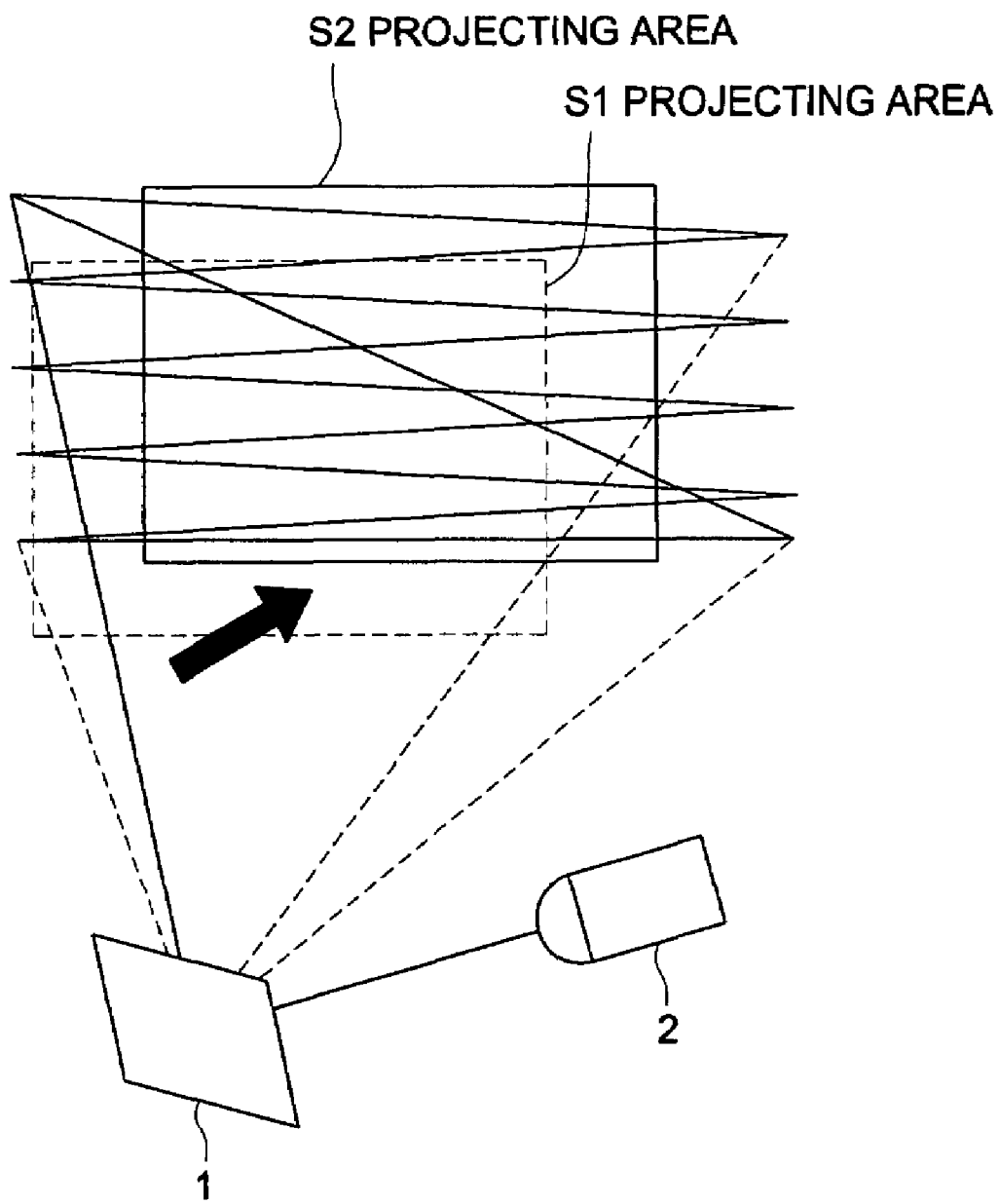
FIG. 5 is a typical view showing the drawing area of the scanning type projector using the optical scanner according to the present invention.
Figure 6:
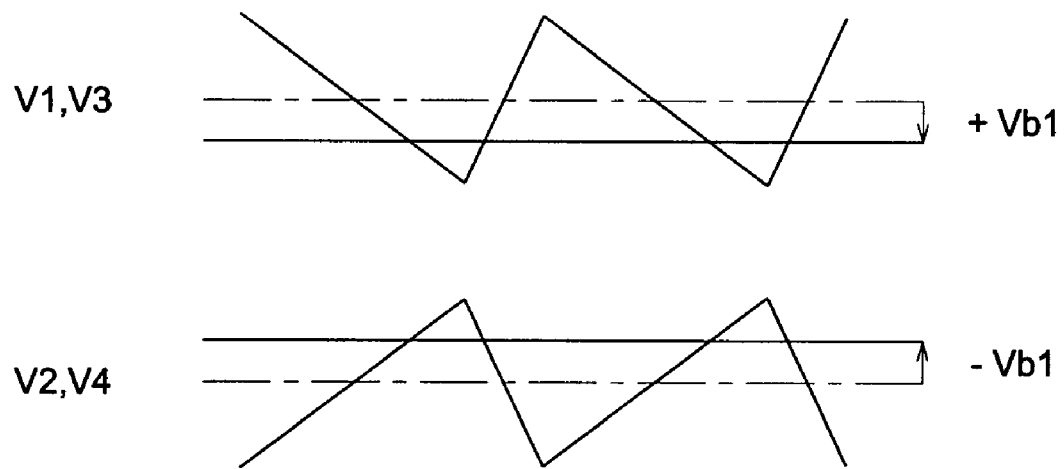
FIGS. 6(a)-(b) are views showing the drive signal by another example of the piezoelectric element in the scanning type projector using the optical scanner according to the present invention.
Figure 6:
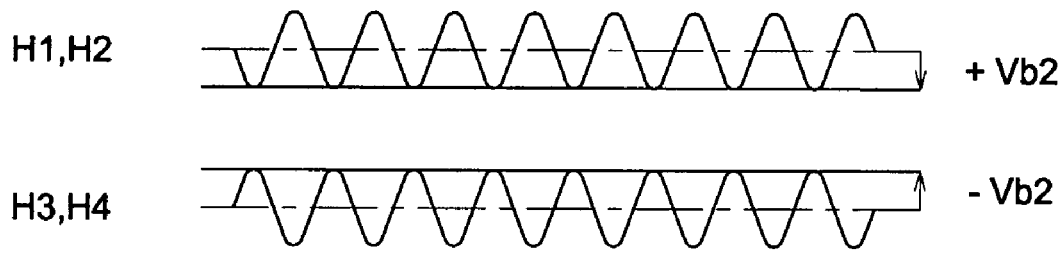

Next, in the luster scanning of the scanning type projector, a method by which the projection area is shifted, will be described by using FIGS. 5, 6. FIG. 5 is a typical view showing the situation when the projection area is shifted. Further, FIG. 6(a) is the waveform when DC potential of the vertical drive signals V1 to V4 is shifted, and FIG. 6(b) is a view showing a waveform when the DC potential of the horizontal drive signals H1 to H4 is shifted.

Because the central position of the deflection of the mirror section 10 is determined corresponding to the DC potential of the vertical drive signals V1 to V4, the horizontal drive signals H1 to H4, when the DC potential of respective drive signals is adjusted, for example, as shown in FIG. 5, the central position of the scanning can be easily shifted, and the projection area can be shifted from S1 to S2.

Specifically, as shown in FIG. 6(a), in the case where the bias voltage +Vb1 is applied on the vertical drive signals V1, V3, and the bias voltage −Vb1 is applied on the vertical drive signal V2, V4, when the central potential of the amplitude of respective drive signals is shifted, the central position of the scanning of the vertical direction can be shifted by the distance corresponding to the bias voltage Vb1. In the same manner, as shown in FIG. 6(b), when the bias voltages +Vb1, −Vb2 are respectively applied on the horizontal drive signals H1, H2 and the horizontal drive signals H3, H4, the central position of the scanning in the horizontal direction can be shifted.

In this manner, when the DC potential of the vertical drive signals V1 to V4, the horizontal drive signals H1 to H4 is adjusted, the central position of the scanning can be easily shifted. That is, because the whole scanning area can be shifted, the projection area of the scanning type projector can be finely adjusted.

Figure 8:
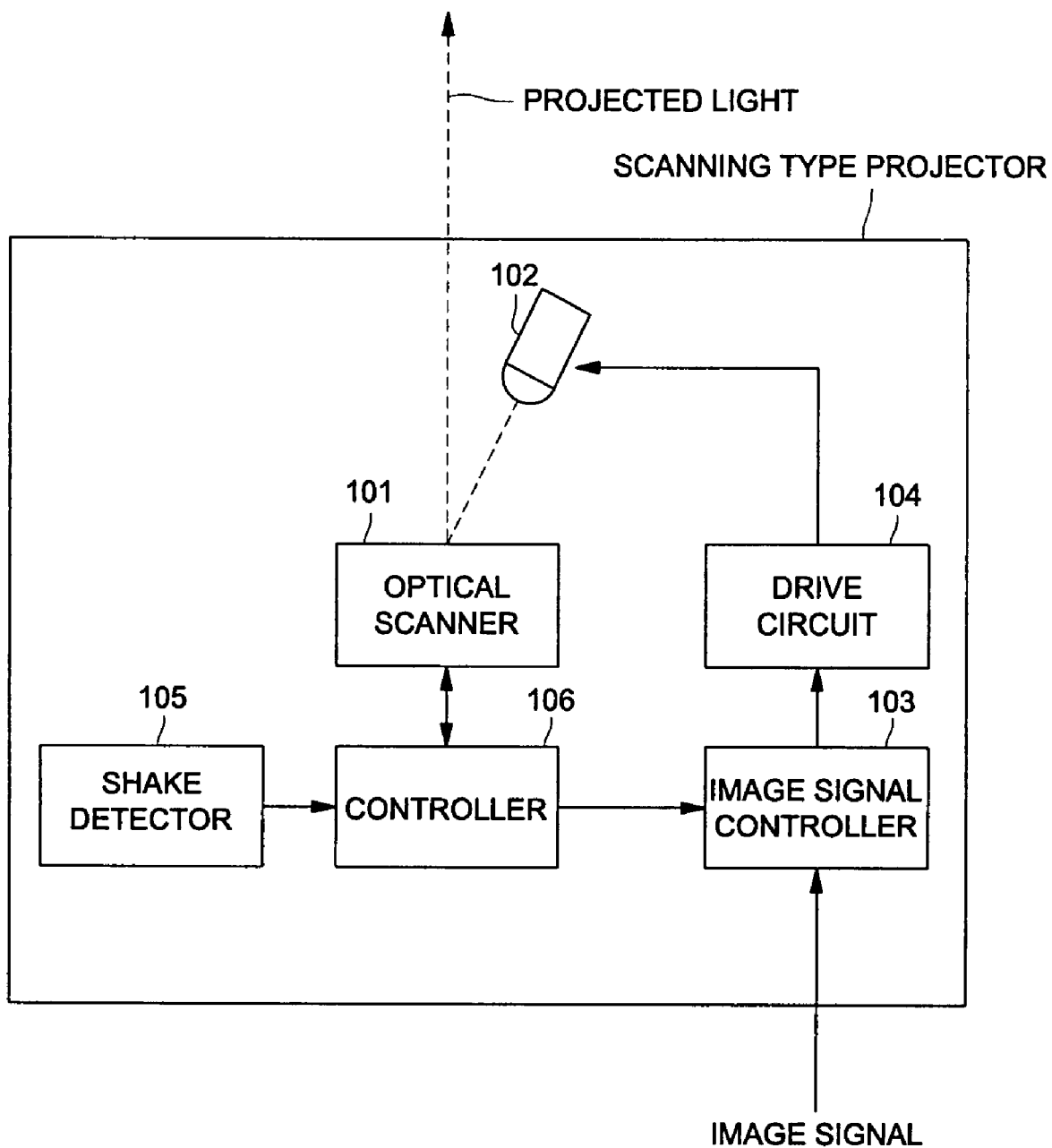
FIG. 8 is a block diagram showing a structure to conduct a hand-shake correcting operation in a scanning type projector employing the optical scanner according to the present invention.

Further, there is a case where the fluctuation is caused in the projection image screen when the scanning type projector is used by free hand, however, the above method to shift the projection position can also be used for the so-called handshake correcting operation (an image stabilization) for suppressing the fluctuation (an image distortion). FIG. 8 is a block diagram showing a structure of a scanning type projector 100 in which a light beam is modulated by an image signal control section 103 and a driving section 104 in accordance with image signals and emitted from a laser diode 102. An optical scanner conducts a raster scanning with the emitted light beam so as to produce an image. In this scanning type projector 100, a fluctuation or a shake of the scanning type projector is detected by a shake detecting section 105 being used, for example, a digital camera, and a control section 106 adjusts a DC potential of each of the above mentioned vertical drive signal and horizontal drive signal for the scanning type projector in accordance with the detected shake so as to cancel a movement of a projection position, whereby the image fluctuation can be suppressed. In this case, because the fluctuation correction is conducted by controlling the deflection mirror for the scanning, from the reason that other light deflection means such as additional lens or variable apex angle prism is unnecessary, the fluctuation correction can be realized by a small sized and low cost device.

As above, referring to the embodiment, the present invention is described, however, the present invention should not be construed by limiting to the embodiment, and it is of course that it can be appropriately changed and improved. For example, by using FIG. 7, the embodiment by another example of the optical scanner according to the present invention, will be described.

Figure 7A:
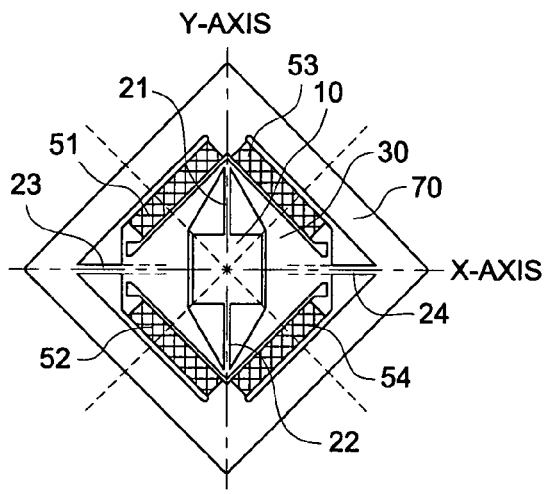
FIGS. 7(a)-(d) are typical views showing the structure by another example of the optical scanner according to the present invention.

As shown in FIG. 7(a), also in the X-axis direction, torsion bars 23, 24 may be provided between the movable frame 30 and the stationary frame 70. Hereby, when it is not necessary that the deflection angle around Y-axis of the movable frame 30 is largely taken, the relative position around Y-axis of the movable frame 30 is made stable, and the movable frame 30 can be smoothly rotated. Further, the resonance frequency can be set high.

Figure 7B:
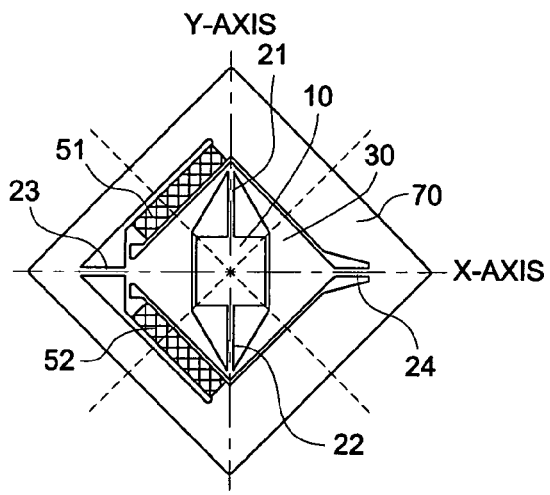
Figure 7C:
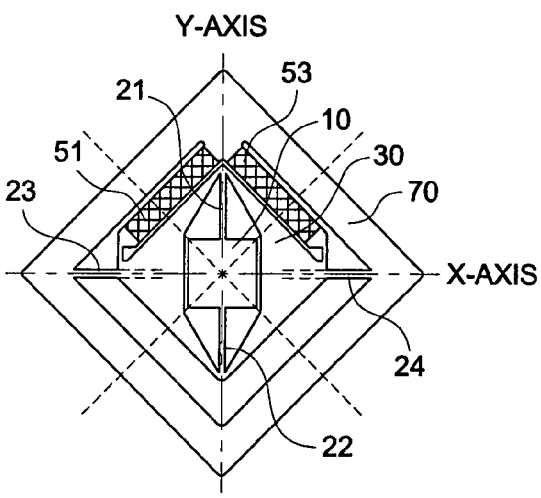

Further, as shown in FIG. 7(b), the number of the piezoelectric elements is decreased and only 2 of the piezoelectric elements 51, 52 may also be allowed. Hereby, the rotation torque or the symmetry of the drive is disadvantageous, however, the drive circuit of the piezoelectric element is simplified, and the cost reduction of the device can be intended. In the same manner, further, as shown in FIG. 7(c), only 2 of the piezoelectric elements 51, 53 may also be allowable. In this case, the torsion bars 23, 24 between the movable frame 30 and the stationary frame 70 are essential, for the purpose that the rotation around X-axis of the movable frame 30 is smoothly conducted.

Figure 7D:
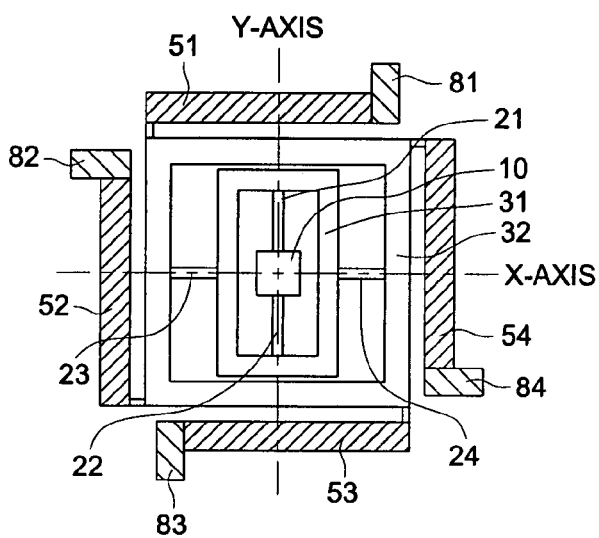

Further, when both of the vertical and horizontal scanning drives are resonance driven, the structure as shown in FIG. 7(d) may also be allowable. The mirror section 10 is supported by the first movable frame 31 through torsion bars 21, 22, further, the movable frame 31 is supported by the second movable frame 32 through torsion bars 23, 24. Then, the piezoelectric elements 51 to 54 are driven by the resonance frequency around X-axis, Y-axis of the oscillation system, and when the movable frame 32 is resonance oscillated, the mirror section 10 can be rotation oscillated around X-axis, Y-axis.

What is claimed is:

1. An optical scanner, comprising:
a mirror section having a reflecting mirror to reflect light;
a movable frame positioned to surround the mirror section and to support the mirror section with a pair of torsion bars arranged to hold the mirror section therebetween;
a stationary frame positioned to surround the movable frame and to support the movable frame with at least a pair of bendable beams, wherein one end of each of the pair of bendable beams is jointed to the stationary frame and the other end is jointed to the movable frame in a vicinity of at least one of a pair of joint sections arranged to hold the movable frame therebetween and a first axis connecting the pair of torsion bars is arranged to be perpendicular to a second axis connecting the pair of joint sections; and
a pair of actuators provided on the pair of bendable beams and to make the pair of bendable beams to cause a bending oscillation upon receipt of a predetermined driving signal so as to rotate the mirror section around the first axis and the second axis.

2. The optical scanner of claim 1, wherein the pair of bendable beams are arranged to face each other across the first axis connecting the pair of torsion bars.

3. The optical scanner of claim 1, wherein the pair of bendable beams are arranged to face each other across the second axis connecting the pair of joint sections.

4. The optical scanner of claim 1, wherein the pair of bendable beams comprises a first pair of bendable beams arranged to face each other across the first axis connecting the pair of torsion bars and a second pair of bendable beams arranged to face each other across the second axis connecting the pair of joint sections.

5. The optical scanner of claim 1, wherein the first axis crosses perpendicularly to the second axis at the center of a mirror surface of the mirror section.

6. The optical scanner of claim 1, wherein the pair of torsion bars are arranged to face to each other on the first axis.

7. The optical scanner of claim 1, wherein the pair of actuators are driven by respective driving signals which have the same phase or respective phases different by 180 degrees.

8. The optical scanner of claim 7, wherein the driving signal has a frequency including a frequency component closer to a resonance frequency of a rotational oscillation around a rotation axis of the torsion bars of the mirror section.

9. The optical scanner of claim 7, wherein the driving signal includes a changeable direct current potential.

10. The optical scanner of claim 7, wherein each of the pair of actuators comprises a piezoelectric element.

11. The optical scanner of claim 1, wherein the mirror section, the movable frame and the stationary frame are integrally structured to form a single body.

12. The optical scanner of claim 1, wherein the mirror section, the movable frame and the stationary frame are integrally structured to form a single plane surface.

13. An optical scanner, comprising:
a movable section;
a movable frame including a frame to surround the movable section and a pair of torsion bars arranged to hold the movable section therebetween so as to support the movable section;
a stationary section positioned outside of the movable frame and having a pair of joint sections arranged to hold and support the movable frame therebetween;
a pair of bendable beams provided between the movable frame and the stationary section;
a pair of actuators provided on the pair of bendable beams so as to bend in response to a driving signal from outside;
wherein the pair of torsion bars and the pair of joint sections are arranged to be perpendicular to each other so that the pair of bendable beams are bent respectively by the bending motion of the pair of actuators and rotates the moving section around two axis.

14. A scanning type projector, comprising:
the optical section described in claim 1;
a detecting section to detect a fluctuation of the scanning type projector caused by a hand shake or a vibration transmitted from outside and to output a shake signal corresponding to the detected fluctuation; and
a control section to control the optical scanner to conduct an image stabilization to correct an image distortion in accordance with the shake signal.

* * * * *